(12) United States Patent
Weinmann et al.

(10) Patent No.: US 12,139,234 B2
(45) Date of Patent: Nov. 12, 2024

(54) METHOD FOR CONTROLLING AN ELECTRIC DRIVE MOTOR OF AN ELECTRICALLY DRIVABLE BICYCLE

(71) Applicant: Robert Bosch GmbH, Stuttgart (DE)

(72) Inventors: Matthias Weinmann, Balingen (DE); Daniel Baumgaertner, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/546,329

(22) PCT Filed: Jan. 24, 2022

(86) PCT No.: PCT/EP2022/051460
§ 371 (c)(1),
(2) Date: Aug. 14, 2023

(87) PCT Pub. No.: WO2022/171420
PCT Pub. Date: Aug. 18, 2022

(65) Prior Publication Data
US 2024/0300615 A1    Sep. 12, 2024

(30) Foreign Application Priority Data
Feb. 15, 2021   (DE) ..................... 10 2021 201 405.4

(51) Int. Cl.
*B62M 6/45*    (2010.01)
*B62M 25/08*   (2006.01)

(52) U.S. Cl.
CPC .............. *B62M 6/45* (2013.01); *B62M 25/08* (2013.01)

(58) Field of Classification Search
CPC .......... B62M 6/45; B62M 6/50; B62M 25/08; B62M 6/00–6/90; B62M 6/55;
(Continued)

(56) References Cited

FOREIGN PATENT DOCUMENTS

CN          106195194 A * 12/2016 ............. F16H 37/10
DE    20 2012 100 098 U1    1/2013
(Continued)

OTHER PUBLICATIONS

International Search Report corresponding to PCT Application No. PCT/EP2022/051460, mailed Jun. 14, 2022 (German and English language document) (5 pages).

*Primary Examiner* — Tinh Dang
(74) *Attorney, Agent, or Firm* — Maginot, Moore & Beck LLP

(57) ABSTRACT

A method for controlling an electric drive motor of an electrically drivable bicycle includes determining a cadence of a rider of the bicycle, and operating the electric drive motor under specification of (i) a first predefined target speed for the electric drive motor, which is lower than the cadence of the rider, and (ii) a first predefined torque for the electric drive motor, when the determined cadence of the rider exceeds a predefined cadence threshold value. The method further includes operating the electric drive motor under specification of (i) a second predefined target speed for the electric drive motor, which is higher than the first target speed, and (ii) a second predefined torque for the drive motor, when a rider torque exerted by the rider on a drive train of the bicycle exceeds a first predefined rider torque threshold value.

10 Claims, 3 Drawing Sheets

(58) Field of Classification Search
CPC ...... B62M 9/133; B62J 45/411; B62J 45/112; B62J 45/113; F16H 37/10; H02K 7/116; B60K 17/08
See application file for complete search history.

(56) References Cited

FOREIGN PATENT DOCUMENTS

| | | | |
|---|---|---|---|
| DE | 10 2014 218 020 A1 | 3/2015 | |
| DE | 10 2018 132 780 A1 | 6/2019 | |
| DE | 102020101268 A1 * | 8/2020 | ............ B62J 45/412 |
| EP | 0 650 887 A2 | 5/1995 | |
| EP | 2 706 005 A1 | 3/2014 | |
| EP | 2 743 166 A1 | 6/2014 | |
| JP | 2020128185 A * | 8/2020 | ............ B62J 45/412 |

\* cited by examiner

METHOD FOR CONTROLLING AN ELECTRIC DRIVE MOTOR OF AN ELECTRICALLY DRIVABLE BICYCLE

This application is a 35 U.S.C. § 371 National Stage Application of PCT/EP2022/051460, filed on Jan. 24, 2022, which claims the benefit of priority to Serial No. DE 10 2021 201 405.4, filed on Feb. 15, 2021 in Germany, the disclosures of which are incorporated herein by reference in their entirety.

BACKGROUND

The disclosure relates to a method for controlling an electric drive motor of an electrically drivable bicycle, as well as to a computer program, a machine-readable storage medium and an evaluation unit, which are configured to perform such a method.

From the prior art, two-wheelers, in particular bicycles such as e-bikes/pedelecs, are known, which are able to support a driving force applied by a user of the two-wheeler to move the two-wheeler by means of a motor, in particular an electric motor. In the case of a pedelec, for example, such motor support is only permitted if the rider of the bicycle is pedaling as well. To determine whether this requirement is met, various sensors are usually used that are set up to detect the rider's pedaling. Examples of such sensors include torque sensors and speed sensors.

In the case of e-bikes, which often have a torque sensor on the pedal, motor support generally only occurs after a rider torque threshold value is exceeded, which is around 7 Nm, for example. Once this torque threshold has been exceeded, the motor then provides a multiple of the rider's power to drive the two-wheeler.

Since the motor is usually not yet active until this point is reached (i.e., the speed corresponds to a value of zero), it takes a certain amount of time for the motor to reach the speed of the bicycle's crank. During this period, the speed of the motor is built up accordingly very quickly, since there is still no counterforce due to a freewheel used to couple the motor to the drive train of the bicycle. As soon as the freewheel is engaged, this can sometimes cause strong vibrations in the drive train, which are often partially compensated by load impact damping methods.

SUMMARY

According to the disclosure, a method for controlling an electric drive motor (hereinafter also abbreviated to "drive motor") of an electrically drivable bicycle (hereinafter also abbreviated to "bicycle") is proposed, wherein the bicycle is, for example, an e-bike or a pedelec. The electric motor is coupled to the drive train of the bicycle by means of a freewheel in such a way that a torque which can be generated by the drive motor leads via the freewheel to a drive support in the forward direction of travel of the bicycle.

In a first step of the method according to the disclosure, a pedal frequency (also called cadence) of a rider of the bicycle is determined, which is preferably detected based on a speed sensor of the bicycle. For example, speed sensors known from the prior art are used for this purpose.

In a second step of the method according to the disclosure, the electric drive motor is operated under specification of a first predefined target speed for the drive motor, which is lower than the cadence of the rider, and under specification of a first predefined torque for the drive motor, if the determined cadence of the rider exceeds a predefined cadence threshold value. It should be noted that the first torque is a maximum permissible torque that can be used to achieve the first target speed and can be correspondingly lower. It should also be noted that the cadence threshold value can also correspond to a value of 0 revolutions per minute. Preferably, the bicycle comprises an evaluation unit which is configured to receive speed information of the speed sensor and torque information of a torque sensor of the bicycle and to implement open-loop and/or closed-loop control of the drive motor on the basis of the speed information and the torque information. The respective target speeds and/or torques and/or corresponding threshold values or variables from which they are derived are preferably stored in an internal and/or external memory unit which is connected to the evaluation unit in terms of information technology.

It should be noted that prior to performing the second method step, the drive motor has a speed of zero, for example, although it is also conceivable that the drive motor at this time may have a speed greater than zero but less than the first target speed.

It should also be noted that the target speeds and torques for the drive motor described here and below each represent those values which act on or are present at the drive train, since a transmission ratio may be used between the drive motor and the drive train (specifically between the motor and the chainring). In other words, these values do not necessarily represent the direct target speeds and torques at the drive motor shaft, but rather the resulting values at the drive train.

It should also be noted that it is possible to link the transition from the first method step to the second method step to additional conditions, which require, for example, that the rider's cadence does not fall below a further cadence threshold value again (alternatively, it is also possible here to use a hysteresis function, etc.) and/or that the cadence does not increase further for a predefined duration and/or that, in the case of several successive starting processes without subsequently occurring rider torque, a specific rider torque must first be registered.

In a third step of the method according to the disclosure, the electric drive motor is operated under specification of a second predefined target speed for the drive motor, which is higher than the first target speed, and under specification of a second predefined torque for the drive motor, if a rider torque exerted by the rider on the drive train exceeds a first predefined rider torque threshold value. It should be noted that the second torque is a maximum permissible torque that can be used to achieve the second target speed and can be correspondingly lower. Preferably, the second torque substantially corresponds to the first torque, or has at least a similar magnitude as the first torque, without thereby limiting a possible relationship between the two torques. Preferably, in this third method step, the second target speed and the second torque are selected such that the freewheel, which is configured to couple the drive motor to the drive train, is engaged and that the torque exerted by the drive motor on the drive train already causes a slight pull on the chain of the bicycle in the forward direction of travel. However, effects of the second target speed and the second torque on the engagement of the freewheel and/or the pull on the chain that deviate from this are also conceivable in connection with the method according to the disclosure. Basically, the first torque and the second torque are set such that they provide essentially no drive support, or no drive support perceptible by a rider of the bicycle. For example, both torque values are set in such a way that they do not exceed a value of 5 Nm each.

In a fourth step of the method according to the disclosure, the drive motor is operated under specification of a third predefined torque for the drive motor if the rider torque exceeds a second predefined rider torque threshold value, which is higher than the first rider torque threshold value, the third rider torque being a target torque to be achieved and being specified in such a way that it causes a predefined drive support. Since there is no longer any difference to the cadence of the rider due to the engagement of the freewheel, which preferably already exists at this point, during the transition to the fourth method step, it is possible to prevent or significantly reduce a load impact when the actual support torque is applied by the drive motor. This results in numerous advantages from the method according to the disclosure, which include increased riding comfort, reduced stress on mechanisms and/or materials, and correspondingly increased durability of components of the bicycle. A further achievable advantage is that the activation of the support by the drive motor can take place more quickly as a result of the method according to the disclosure, thus enabling particularly dynamic/sporty driving operation.

Since, in the second and third method steps, the respective target speeds represent the actual reference variables in the open-loop and/or closed-loop control of the drive motor, these method steps can be assigned to a control mode of the drive motor, which is called speed control mode in this case. In contrast, the control mode for the drive motor represented by the fourth method step can be considered to be a torque control mode, since the third torque here represents the actual reference variable in the open-loop and/or closed-loop control of the drive motor. Accordingly, during the transition from the third method step to the fourth method step, the evaluation unit, which controls the drive motor, switches from speed control mode to torque control mode. In this context, it is conceivable that the respective control modes are implemented by two independent logic units and/or software units in the evaluation unit, which are switched between depending on the situation.

Further according to the disclosure, a method for controlling an electric drive motor of an electrically drivable bicycle is proposed. Embodiments of the bicycle and a coupling of the drive motor to a drive train of the bicycle preferably correspond to the explanations in the method described above, and therefore reference is made thereto to avoid repetition.

In a step of the method according to the disclosure, a rider torque exerted by a rider of the bicycle on a drive train of the bicycle and a cadence of the rider are determined.

In a further step of the method according to the disclosure, the electric drive motor is operated under specification of a third predefined target speed and a fourth predefined torque for the drive motor, if the rider torque is below a third predefined rider torque threshold value for a first predefined period of time. The first predefined period corresponds, for example, to a period of 200 ms to 300 ms or a period different therefrom. It should be noted that the fourth torque is a maximum permissible torque that can be used to achieve the third target speed and can be correspondingly lower.

In a further step of the method according to the disclosure, the electric drive motor is operated under specification of a fourth predefined target speed, which is lower than the third target speed, and a fifth predefined torque for the drive motor, if the rider torque is below the third rider torque threshold value for a second predefined period of time, which is longer than the first period of time, or if a number of pedal revolutions exceeds a predefined pedal revolution threshold value (e.g., one revolution), while the rider torque (MF) is below the third rider torque threshold value (MFS3). (e.g., one revolution) while the rider torque (MF) is below the third rider torque threshold (MFS3), wherein the drive motor is coupled to the drive train of the bicycle by means of a freewheel, and wherein the fourth torque and the fifth torque are set to provide substantially no drive support. It should be noted that the fifth torque is a maximum permissible torque that can be used to achieve the fourth target speed and can be correspondingly lower. For example, both torque values are set so that they do not exceed a value of 4 Nm to 5 Nm each. The second predefined period corresponds, for example, to a period of 800 ms to 1000 ms or a period different therefrom.

Among other things, the above-described method offers the advantage that a transition from a state of active drive motor support to a state of non-active drive motor support is preferably neither haptically nor acoustically perceptible by a rider of the bicycle, which in particular improves a riding comfort for the rider.

It should be noted in general that with regard to the procedures described above, there are basically no restrictions concerning possible transitions between the respective method steps. In particular, in cases in which a rider of the bicycle does not fulfill all the necessary conditions for a transition from a non-drive motor-supported riding mode to a drive motor-supported riding mode or vice versa (e.g., because he terminates a starting process prematurely or reapplies a briefly interrupted rider torque), it is conceivable, depending on further boundary conditions, to switch back to respectively suitable preceding method steps (e.g., to the respective initial state without restricting the methods according to the disclosure thereto).

In summary, the disclosure relates to a method for controlling an electric drive motor of an electrically drivable bicycle which causes an activation of a drive support provided by the electric drive motor and to a method for controlling an electric drive motor of an electrically drivable bicycle, which causes a deactivation of a drive support provided by the electric drive motor.

In an advantageous embodiment of the disclosure, the cadence threshold value corresponds to a value of 5 revolutions per minute to 25 revolutions per minute, preferably a value of 10 revolutions per minute to 20 revolutions per minute, and in particular preferably a value of 15 revolutions per minute. Furthermore, the target speed preferably corresponds to a value of 60% to 99%, preferably a value of 70% to 90%, and in particular preferably a value of 80% of the previously determined cadence of the rider. Particularly preferably, the second target speed corresponds substantially to the cadence of the rider. Particularly advantageously, the second target speed corresponds exactly to the determined cadence of the rider or a higher value.

Advantageously, the first rider torque threshold value corresponds to a value of 1 Nm to 9 Nm, preferably a value of 3 Nm to 7 Nm, and in particular preferably a value of 5 Nm. Further, the second rider torque threshold value advantageously corresponds to a value of 4 Nm to 15 Nm, preferably a value of 6 Nm to 12 Nm, and in particular preferably a value of 7 Nm to 9 Nm. In addition, the third torque advantageously corresponds to at least twice, preferably at least three times and in particular preferably at least four times the value of a respective rider torque.

In a further advantageous embodiment of the disclosure, a transition between the second torque and the third torque is performed successively. This can be achieved by specifying one or more intermediate values between the second torque and the third torque during the duration of the transition between these two values, so that a more or less smooth transition between the two values is achieved. This makes it possible to further reduce a haptic and/or acoustic effect of such a transition that may still be slightly perceptible by a rider of the bicycle, so that a riding comfort can be additionally improved.

Preferably, the third predefined target speed corresponds substantially to the cadence of the rider and, particularly preferably, at least to the previously determined cadence of the rider. Furthermore, the third rider torque threshold value preferably corresponds to a value of 4 Nm to 15 Nm, preferably a value of 6 Nm to 12 Nm, and more preferably a value of 7 Nm to 9 Nm. Alternatively or additionally, the electric drive motor is deactivated (i.e., de-energized) when the rider torque is below the third rider torque threshold value for a third predefined time period that is longer than the first time period and the second time period, or when the rider cadence progressively slows while the rider torque (MF) is below the third rider torque threshold value (MFS3). This can save electrical energy carried in the bicycle (e.g. in a battery). The third predefined period corresponds, for example, to a period of 1500 ms to 3000 ms or a period different therefrom.

In another advantageous embodiment of the disclosure, a respective torque for the drive motor is determined taking into account an estimated load applied to the drive motor. For this purpose, current measured values of the speed sensor and the torque sensor of the bicycle are preferably used in order to enable an exact engagement state (already engaged or still freewheeling) of the drive motor to be determined on the basis of these measured values even in changing load situations (e.g. driving uphill, changing gear under full load, etc.). This information is then taken into account as a manipulated variable and/or controlled variable when determining the respective torques. It should be noted that this can be advantageously used for both the process of activation and the process of deactivation of the drive motor support. Furthermore, it is possible to take the estimated load into account only for a part of the respective torque values of the methods according to the disclosure.

Further according to the disclosure, a computer program is proposed which is configured to execute a method according to the above description.

Further according to the disclosure, a machine-readable storage medium is proposed on which the aforementioned computer program is stored. Possible storage media are, for example, electronic and/or magnetic and/or optical and/or different storage media.

Further according to the disclosure, an evaluation unit is proposed which is configured to execute a method according to the above description. The evaluation unit is configured, for example, as an ASIC, FPGA, processor, digital signal processor, microcontroller, or the like. In addition, it is conceivable that the evaluation unit is a component of an electronic unit of the drive motor or an independent component. Furthermore, it is conceivable that the evaluation unit is connected in terms of information technology with an internal and/or an externally connected memory unit, for example, in order to store data received and/or calculated by the evaluation unit. In addition, it is conceivable that the memory unit is the above-mentioned memory unit which has the computer program implementing the method steps according to the disclosure, which is executed by the evaluation unit.

BRIEF DESCRIPTION OF THE DRAWINGS

Embodiment examples of the disclosure are described in detail below with reference to the accompanying drawings. The figures show.

DETAILED DESCRIPTION

Figure 1:
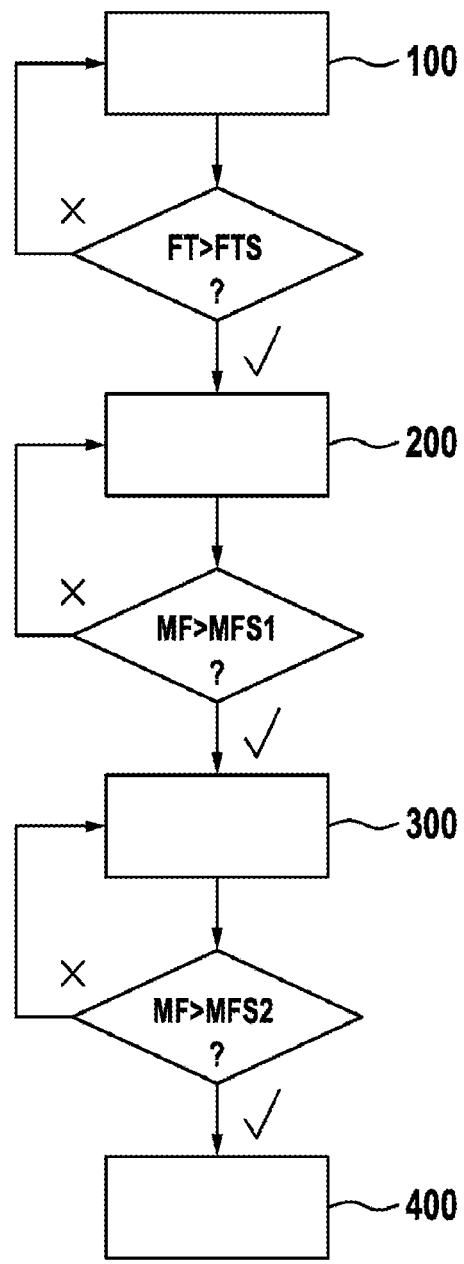
FIG. 1 a flow chart illustrating steps of an embodiment example of a method according to the disclosure.

FIG. 1 shows a flow chart illustrating steps of an embodiment example of a method according to the disclosure for controlling an electric drive motor 10 of an electrically drivable bicycle, wherein an initial state of the bicycle here is a state in which the drive motor 10 does not provide any drive support and in which the rider does not apply any rider torque MF.

In step 100, an evaluation unit 30 of the bicycle is used to determine a cadence FT of a rider of the bicycle by the evaluation unit 30 receiving measurement signals from a speed sensor of the bicycle.

As soon as the rider's cadence FT exceeds a cadence threshold value FTS of 15 revolutions per minute, the drive motor 10 is operated by means of a control by the evaluation unit 30 in step 200 under specification of a first target speed N1, which in this case corresponds to 80% of the determined rider's cadence FT, and a first torque M1 for the drive motor 10. The first torque M1 here corresponds to an initial value of 8 Nm and is automatically reduced to a value of 4 Nm within a period of 200 ms. It should be noted that the first torque M1 is a maximum permissible torque As soon as a rider torque MF exerted by the rider on the drive train of the bicycle via the pedals 60 exceeds a first rider torque threshold value MFS1, which here corresponds to a value of 5 Nm, the drive motor 10 is operated in step 300 at a second target speed N2, which here corresponds to the determined cadence FT, and at a second torque M2 for the drive motor 10, the second torque M2 here corresponding to a value of 8 Nm. This step causes the drive motor 10, which is coupled to the drive train of the bicycle by means of a freewheel, to now be in engagement with the drive train via the freewheel.

As soon as the rider torque MF subsequently exceeds a second rider torque threshold value MFS2, which here corresponds to a value of 7 Nm, the drive motor 10 is operated in step 400 under specification of a third torque M3, which here corresponds to four times the value of the rider torque MF.

Advantageously, a transition between the second torque M2 and the third torque M3 is performed using a plurality of intermediate values so that a smooth transition between the second torque M2 and the third torque M3 is achieved.

Furthermore, an estimated load applied to the drive motor 10 is preferably determined on the basis of measured values of the speed sensor and the torque sensor in order to incorporate this information into the determination of respective torque values.

Figure 2:
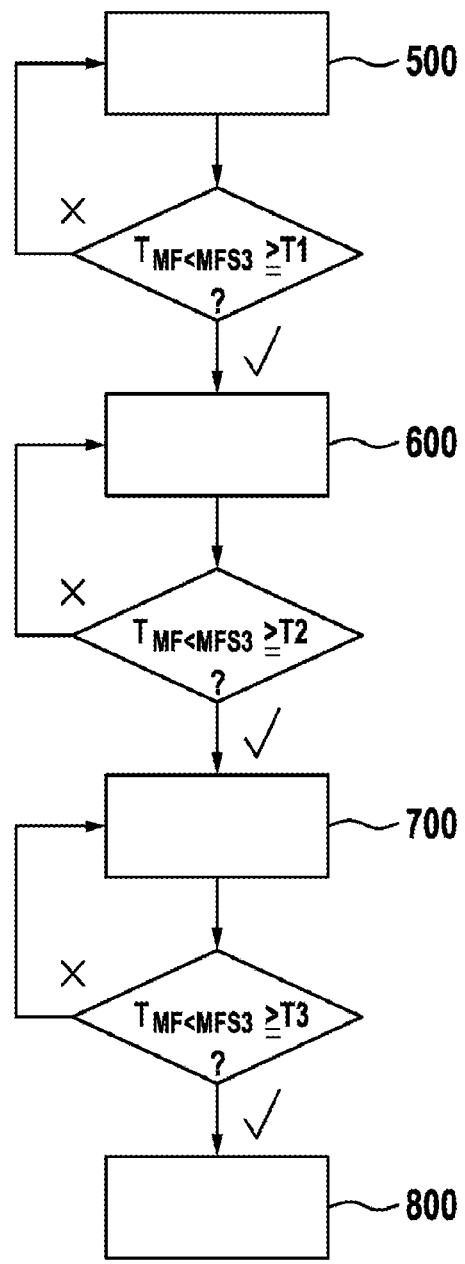
FIG. 2 a flow chart illustrating steps of an embodiment example of another method according to the disclosure.

FIG. 2 shows a flow chart illustrating steps of an embodiment example of a further method according to the disclosure for controlling an electric drive motor 10 of an electrically drivable bicycle, wherein an initial state of the bicycle here is a state in which the drive motor 10 provides active drive support while the rider applies rider torque.

In step 500, an evaluation unit 30 of the bicycle is used to determine a rider torque MF exerted by a rider of the bicycle on the drive train and a cadence FT of the rider by the evaluation unit 30 receiving measurement signals of a speed sensor and a torque sensor of the bicycle.

As soon as the rider torque MF is below a third rider torque threshold value MFS3, which here corresponds to a value of 7 Nm, for a first time period T1, which here corresponds to a value of 200 ms, the drive motor 10 is operated in step 600 under specification of a third target speed N3 at the level of the currently determined cadence FT and under specification of a fourth torque M4, which here corresponds to a value of 15 Nm.

As soon as the rider torque MF is then below the third rider torque threshold value MFS3 for a second period T2, which here corresponds to a value of 800 ms, the drive motor 10 is operated under specification of a fourth target speed N4, which here corresponds to 80% of the current cadence TF, and under specification of a fifth torque M5, which here corresponds to a value of 4 Nm.

Subsequently, as soon as the rider torque MF is below the third rider torque threshold value MFS3 for a third time period T3, which here corresponds to a value of 1.5 s, the electric drive motor 10 is deactivated to save an electrical energy of a battery 50 of the bicycle.

Figure 3:
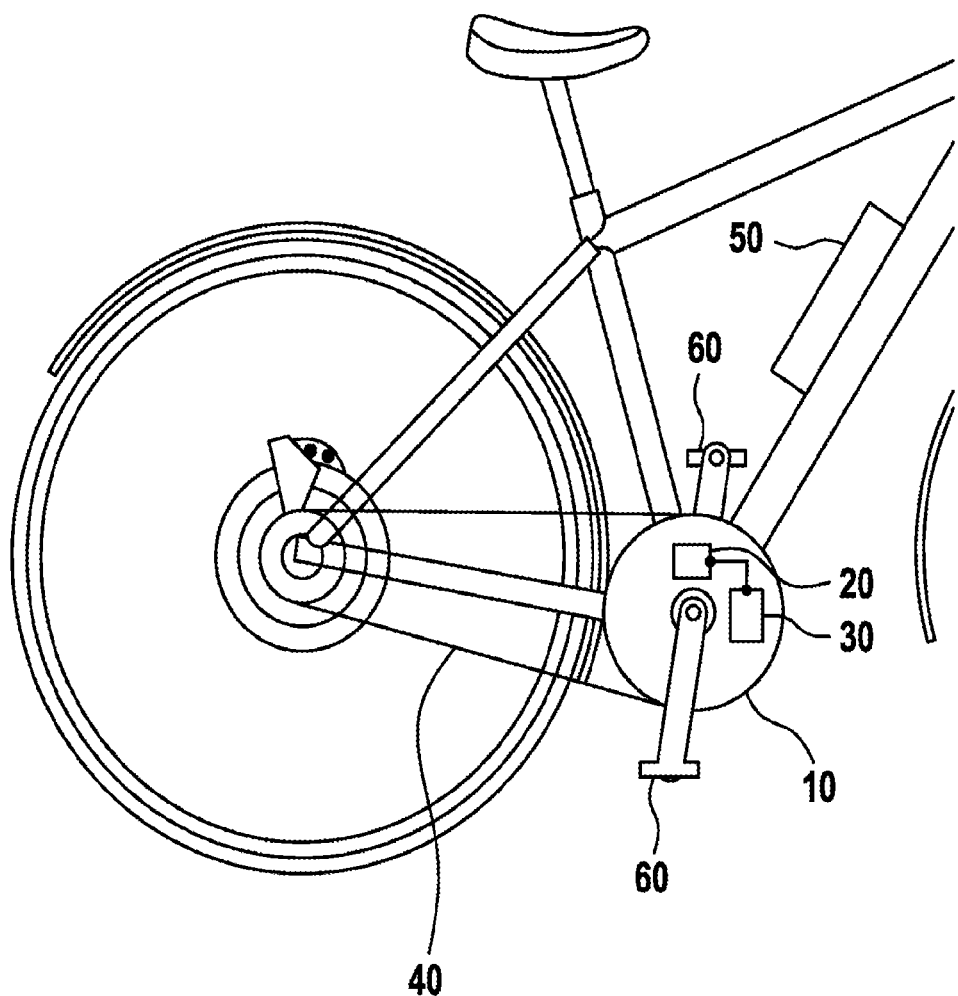
FIG. 3 a schematic view of components according to the disclosure of a bicycle.

FIG. 3 shows a schematic view of components according to the disclosure of a bicycle. The bicycle has an electric drive motor 10 which is supplied with electrical energy by means of a rechargeable battery 50. The drive motor 10 is configured to be coupled to a bicycle chain 40 of the bicycle by means of a freewheel (not shown) to provide drive support to the bicycle when coupled. The bicycle further comprises two pedals 60, through which the rider of the bicycle is able to apply a rider torque MF to the bicycle chain 40. The drive motor 10 comprises an evaluation unit 30, which is connected to a memory unit 20 in terms of information technology and which is set up, on the basis of a computer program stored in the memory unit 20, to carry out all the steps of the methods according to the disclosure described in this disclosure.

The invention claimed is:

1. A method for controlling an electric drive motor of an electrically drivable bicycle comprising:
   determining a cadence of a rider of the bicycle;
   operating the electric drive motor under specification of (i) a first predefined target speed for the electric drive motor, which is lower than the determined cadence of the rider, and (ii) a first predefined torque for the electric drive motor, when the determined cadence of the rider exceeds a predefined cadence threshold value;
   operating the electric drive motor under specification of (i) a second predefined target speed for the electric drive motor, which is higher than the first predefined target speed, and (ii) a second predefined torque for the electric drive motor, when a rider torque exerted by the rider on a drive train of the bicycle exceeds a first predefined rider torque threshold value; and
   operating the electric drive motor under specification of a third predefined torque for the electric drive motor, when the rider torque exceeds a second predefined rider torque threshold value, which is higher than the first predefined rider torque threshold value,
   wherein a freewheel is configured to couple the electric drive motor to the drive train of the bicycle,
   wherein the first predefined torque and the second predefined torque are each maximum permissible torques and are set to provide substantially no drive support for the bicycle, and
   wherein the third predefined torque is a target torque and is set to provide a predefined drive support for the bicycle.

2. The method according to claim 1, wherein:
   the predefined cadence threshold value corresponds to a value of five revolutions per minute to twenty-five revolutions per minute,
   the first predefined target speed corresponds to a value of 60% to 99% of the predefined cadence of the rider, and/or
   the second predefined target speed corresponds substantially to the predefined cadence of the rider.

3. The method according to claim 1, wherein:
   the first predefined rider torque threshold value corresponds to a value of 1 Nm to 9 Nm,
   the second predefined rider torque threshold value corresponds to a value of 4 Nm to 15 Nm, and/or
   the third predefined torque corresponds to at least twice the rider torque.

4. The method according to claim 1, wherein a transition between the second predefined torque and the third predefined torque is performed successively.

5. A method for controlling an electric drive motor of an electrically drivable bicycle comprising:
   determining a rider torque exerted by a rider of the bicycle on a drive train of the bicycle;
   determining a cadence of the rider;
   operating the electric drive motor under specification of (i) a third predefined target speed, and (ii) a fourth predefined torque for the electric drive motor when the determined rider torque is below a third predefined rider torque threshold value for a first predefined time period; and
   operating the electric drive motor under specification of (i) a fourth predefined target speed, which is lower than the third predefined target speed, and (ii) a fifth predefined torque for the electric drive motor, when the determined rider torque is below a third predefined rider torque threshold value for a second predefined period of time, which is longer than the first predefined period of time, or when a number of pedal revolutions of the bicycle exceeds a predefined pedal revolution threshold value while the determined rider torque is below the third predefined rider torque threshold value,
   wherein a freewheel is configured to couple the electric drive motor to the drive train of the bicycle, and
   wherein the fourth predefined torque and the fifth predefined torque are each maximum permissible torques and are set to provide substantially no drive support for the bicycle.

6. The method according to claim 5, wherein:
   the third predefined target speed corresponds substantially to the determined cadence of the rider, and/or the third predefined rider torque threshold value corresponds to a value of 4 Nm to 15 Nm, and
   the method further comprises deactivating the electric drive motor when the determined rider torque is below the third predefined rider torque threshold value for a third predefined period of time, which is longer than the first predefined period of time and the second predefined period of time, or when the determined rider cadence progressively slows down while the determined rider torque is below the third predefined rider torque threshold value.

7. The method according to claim 1, wherein a respective torque for the electric drive motor is set based on an estimated load applied to the electric drive motor.

8. The method according to claim 1, wherein a computer program is configured to perform the method.

9. The method according to claim 8, wherein a non-transitory machine-readable storage medium is configured to store the computer program.

10. The method according to claim 1, wherein an evaluation unit is configured to carry out the method.

* * * * *